United States Patent [19]
Taira et al.

[11] Patent Number: 6,014,459
[45] Date of Patent: Jan. 11, 2000

[54] IMAGE FORMING APPARATUS

[75] Inventors: Masayoshi Taira, Yokohama; Yoshihiro Hosomi; Hirokazu Takahashi, both of Yokohama; Yoshio Mizuno, Ichikawa; Tokuharu Kaneko, Yokohama; Satoshi Kaneko, Kawasaki; Taisei Fukada, Nagaokakyo; Keizo Isemura, Koganei; Akihiko Satoh; Hirohiko Kishimoto, both of Kawasaki; Masahiro Serizawa; Noriaki Matsui, both of Yokohama, all of Japan

[73] Assignee: Canon Kabushiki Kaisha, Tokyo, Japan

[21] Appl. No.: 09/313,736

[22] Filed: May 18, 1999

Related U.S. Application Data

[62] Division of application No. 08/556,700, Nov. 13, 1995, Pat. No. 5,940,583.

[30] Foreign Application Priority Data

Nov. 15, 1994 [JP] Japan .................................. 6-280497
Nov. 15, 1994 [JP] Japan .................................. 6-280498

[51] Int. Cl.[7] ............................................... G06K 9/34
[52] U.S. Cl. ........................... 382/176; 382/181; 358/296
[58] Field of Search .................................... 382/173, 181, 382/176, 177, 180, 317; 358/462, 296

[56] References Cited

U.S. PATENT DOCUMENTS

| | | |
|---|---|---|
| 4,860,376 | 8/1989 | Tanaka et al. . |
| 4,907,283 | 3/1990 | Tanaka et al. . |
| 5,220,394 | 6/1993 | Kato et al. ............................... 355/309 |
| 5,319,745 | 6/1994 | Vinsonneau et al. .................... 395/144 |
| 5,339,169 | 8/1994 | Meguro et al. . |
| 5,396,588 | 3/1995 | Froessl . |
| 5,444,840 | 8/1995 | Froessl ................................... 382/181 |
| 5,509,092 | 4/1996 | Hirayama et al. . |
| 5,666,139 | 9/1997 | Thielens et al. . |

*Primary Examiner*—Phuoc Tran
*Attorney, Agent, or Firm*—Fitzpatrick, Cella, Harper & Scinto

[57] ABSTRACT

The apparatus reads an original by an image reader, and if it recognizes caption(s) included in the original, stores a page number of the original into a memory, thereafter, performs copying based on the stored page number such that the original page including the caption is transferred onto the front side of a recording sheet.

8 Claims, 14 Drawing Sheets

F I G. 13

TABLE OF CONTENTS

CHAPTER ONE  WAY TO SOFTWARE ENGINEER 1.1 WHAT IS INTELLIGENCE? ---------------- 1
  1.2 WHAT IS STRENGTH? ---------------- 2
  1.3 WHAT IS LUCK?  ---------------- 3

IMAGE FORMING APPARATUS

This application is a divisional of application Ser. No. 08/556,700 filed Nov. 13, 1995, now U.S. Pat. No. 5,940,583.

BACKGROUND OF THE INVENTION

This invention relates to an image forming apparatus which has a character recognition function.

When a user would like to copy a document so that a page with a caption is on the front side, in double-sided copying from a document a having a plurality of single-sided/double-sided pages, the user has to manually divide the pages into several sets of pages each having a page with a caption on top, and performs a plurality of jobs using a copying machine. Thus, the copying operation in this case has been troublesome.

Further, an operator conventionally looks through the content of the document, and forms a table of contents using a word processor and the like, then prints out the table of contents. In this manner, this operation is also tiresome.

SUMMARY OF THE INVENTION

Accordingly, the present invention has been made to solve the above problems and has its object to provide an image forming apparatus which attains improved utility by controlling its output such that a page of a document including specific character(s) is copied on the front side of a recording sheet.

According to the present invention, the foregoing object is attained by providing an image forming apparatus, comprising: original reading means for reading an original; character recognition means for performing character recognition on the original read from the original, by the original reading means; extraction means for extracting a specific character array included in the original, based on the results of recognition by the character recognition means; memory means for storing page information of the original including the specific character array; and control means for controlling the output thereof based on the page information stored in the memory means.

In accordance with the present invention as described above, the apparatus reads an original document page, performs character recognition, and extracts a specific character array, included in the document, based on the recognition results. Then, the apparatus stores the page number of the document page including the extracted specific character array, and controls outputting based on the stored page number.

Another object of the present invention is to provide an image forming apparatus which automatically edits a table of contents of a document, thus attaining improved utility.

According to the present invention, the foregoing object is attained by providing an image forming apparatus which automatically edits a table of contents by using a character recognition function, comprising: extraction means for extracting content information indicative of a caption of an original and a page number of the original, by using the character recognition function; storage means for storing the content information extracted by the extraction means; and output means for editing a table of contents, based on the contents information stored in the storage means and outputting the table of contents.

In accordance with the present invention as described above, the apparatus extracts a caption of a part of a document and content information including the page number of the page including the caption, and using a character recognition function, stores the extracted content information, edits a table of contents based on the stored content information, and outputs the edited table of contents.

Further, the present invention provides an image forming apparatus which automatically edits a table of contents by using a character recognition function, comprising: extraction means for extracting content information indicative of a caption of an original and a page number of the original, by using the character recognition function; counter means for counting the number of pages of the original; storage means for storing the caption extracted by the extraction means and a count value indicative of the number of pages counted by the counter means, as content information; and output means for editing a table of contents, based on the content information stored in the storage means and outputting the table of contents.

In accordance with the present invention as described above, the apparatus extracts a caption of a part of a document using a character recognition function, counts the number of pages of the document, stores the extracted caption and the count value as content information, edits a table of contents based on the stored content information, and outputs the edited table of contents.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is an example of a table of contents; and

DETAILED DESCRIPTION OF THE PREFERRED EMBODIMENTS

Preferred embodiments of the present invention will now be described in detail in accordance with the accompanying drawings.

[First Embodiment]

Figure 1:
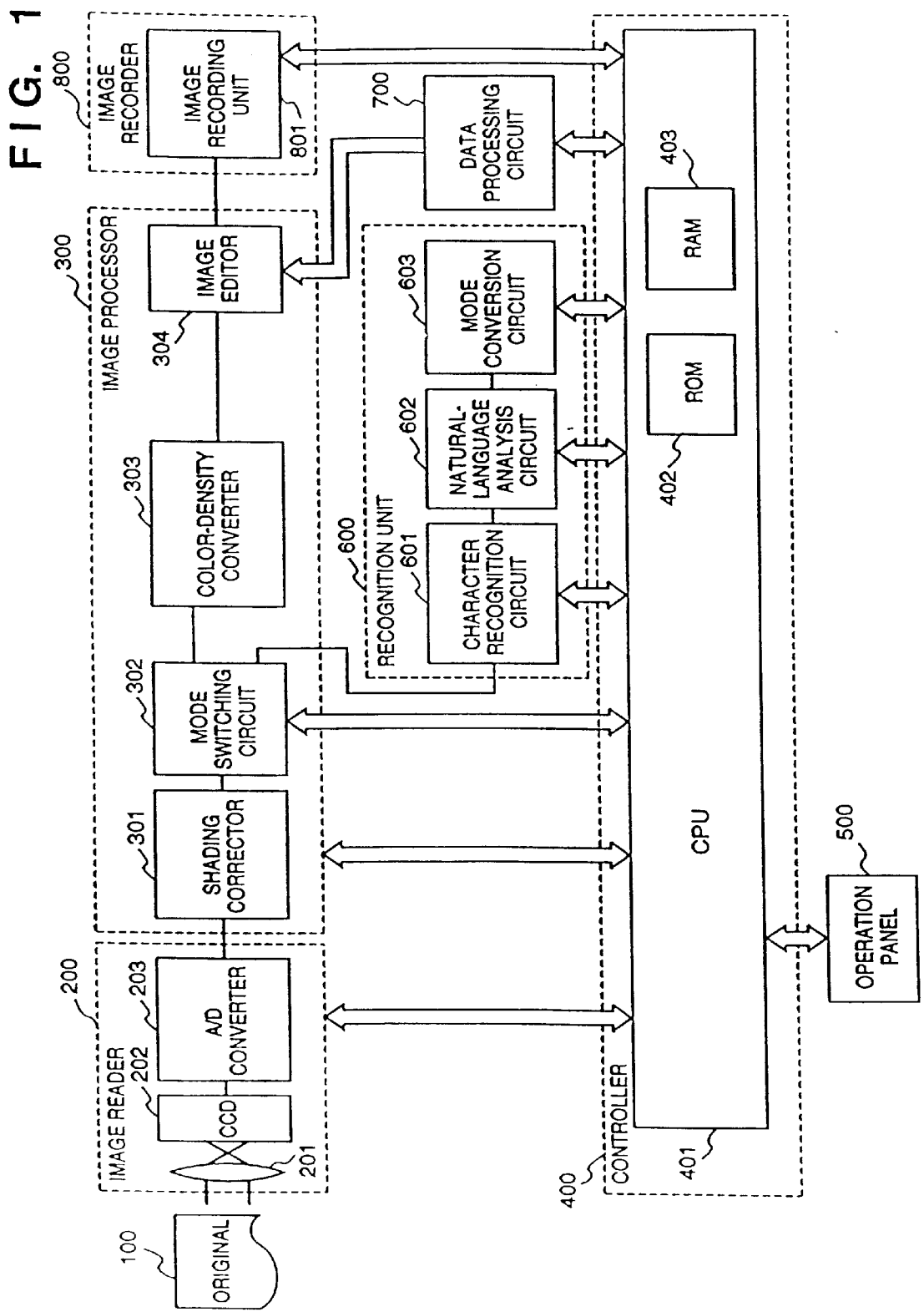
FIG. 1 is a block diagram showing the construction of an image copying apparatus according to a first embodiment of the present invention.

FIG. 1 is a block diagram showing the construction of an image copying apparatus according to a first embodiment of the present invention. As shown in FIG. 1, an original 100 is optically read by an image reader 200, and reflected light from the original is inputted into an A/D converter 203, via a CCD line sensor 202, then an A/D-converted signal is inputted into an image processor 300. At the image processor 300, first shading correction is performed by a shading corrector 301 on the input image signal, and switching of signal-output destination is made by mode switching circuit 302, based on set current mode, i.e., image processing setting mode or copying mode. If the mode is the copying mode, the image signal is density-converted by a color-density converter 303, and outputted to an image editor 304. Prior to processing at the image editor 304, data-setting processing is performed by a data processing circuit 700 on the image signal, in accordance with data as settings such as image processing setting, stored in an RAM 403 of a controller 400. The set data processing is transferred to the image editor 304, and processing is performed on the image signal. When the processing at the image processor is completed, the processed image signal is outputted to an image recording unit 801 which comprises a control circuit for a motor for conveying recording sheets, a laser-recording circuit for writing the image signal inputted from the image processor 300 into an electrostatic drum, and a development control circuit for performing development. Note that an image recorder 800 will be described in detail later.

If the current mode is the image processing setting mode, the mode switching circuit 302 switches the output of the image signal to a recognition unit 600. At the recognition unit 600, first, a character recognition circuit 601 separates an image by one character (character pattern) from the input image and performs character recognition. The character recognition circuit 601 has a dictionary for character recognition. As the character recognition is completed, a natural-language analysis circuit 602 analyzes each character code and forms a word, further analyzes the meaning of the word, and converts the word into a knowledge code. As the natural-language analysis is completed, the knowledge code is outputted into a mode conversion circuit 603. The mode conversion circuit 603 has an inference circuit which infers the correspondence between the knowledge code generated by the natural-language analysis circuit 602 and the content of the knowledge base. Note that the ROM 402 and RAM 403 of the controller 400 respectively hold a general knowledge base and a knowledge base unique to the apparatus. The unique knowledge base is updated each time the image processing mode is activated, through the apparatus' own learning function.

At the inference circuit (603), if the knowledge code corresponds with the content of the image processing setting, the current mode is converted to the image processing mode. If the knowledge code does not correspond with the content of the image processing setting, a CPU 401 of the controller 400 displays a mode setting image for setting the appropriate mode on an operation panel 500, based on the knowledge code, thus advising a user to input a setting. As the setting is made on the operation panel 500, the image processing mode is stored into the RAM 403 of the controller 400. Then, the processing at the mode conversion circuit 603 is over.

The operation panel 500 has a group of various keys for designating image editing contents to the image processor, and an image copying operation, such as the number of copies, a zoom ratio and the like, a group of various LED's, and a display panel for displaying the content of operation and the like. Note that the operation panel 500 will be described in detail with reference to FIG. 3. later.

Figure 2:
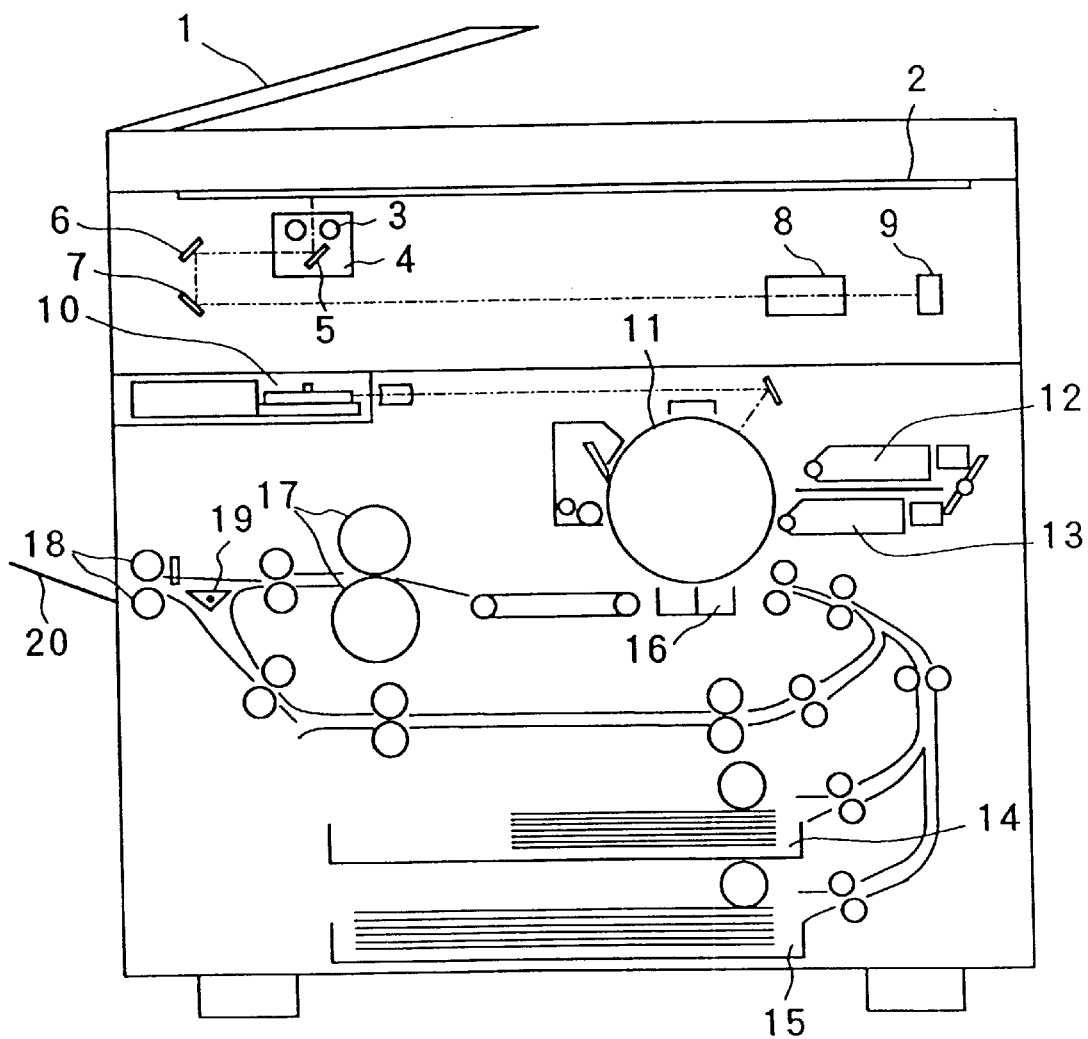
FIG. 2 is a cross-sectional view of the entire structure of the image copying apparatus according to the first embodiment.

FIG. 2 is a cross-sectional view of the structure of the image copying apparatus of the present embodiment. In FIG. 2, reference numeral 1 denotes a document feeder (DF) as document feeding means, for feeding a document set therein to a predetermined position on a glass platen 2, by one or two sheets. Serially Numeral 4 denotes a scanner comprising a lamp 3 and scanning mirrors 5 to 7. When the original fed by the original feeder 1 is placed on the glass platen 2, the scanner 4 reciprocates in a predetermined direction. Light reflected from the original is passed through a lens 8 via the scanning mirrors 5 to 7, and focused on an image sensor 9 into an image. Numeral 10 denotes an exposure controller, comprising a laser scanner, for emitting a light beam modulated based on the image data outputted from the image processor onto an electrostatic drum 11; 12 and 13 denote developers for visualizing the electrostatic image formed on the electrostatic drum 11 with developing material (toner) in a predetermined color; and 14 and 15 denote, paper trays on which a predetermined-sized recording sheets accumulated, which are then conveyed to a resist roller by the drive of a convey roller. The recording sheets are re-fed at a timing where the top end of the sheet meets with the end of the image formed on the electrostatic drum 11.

Numeral 16 denotes a separating discharger for separating a recording sheet from the electrostatic drum 11 after the toner image developed on the electrostatic drum 11 has been transferred onto the recording sheet; 17 denotes a fixing unit for fixing the toner image onto the recording sheet; 18 denotes a discharge roller for discharging the recording sheet on which the image formation has been completed onto a tray 20; and 19 denotes a direction flapper for switching a direction for conveying the recording sheet after the image formation to a discharge orifice or internal conveyance direction for overlaying/double-sided image formation process.

<Operation Panel>

Figure 3:
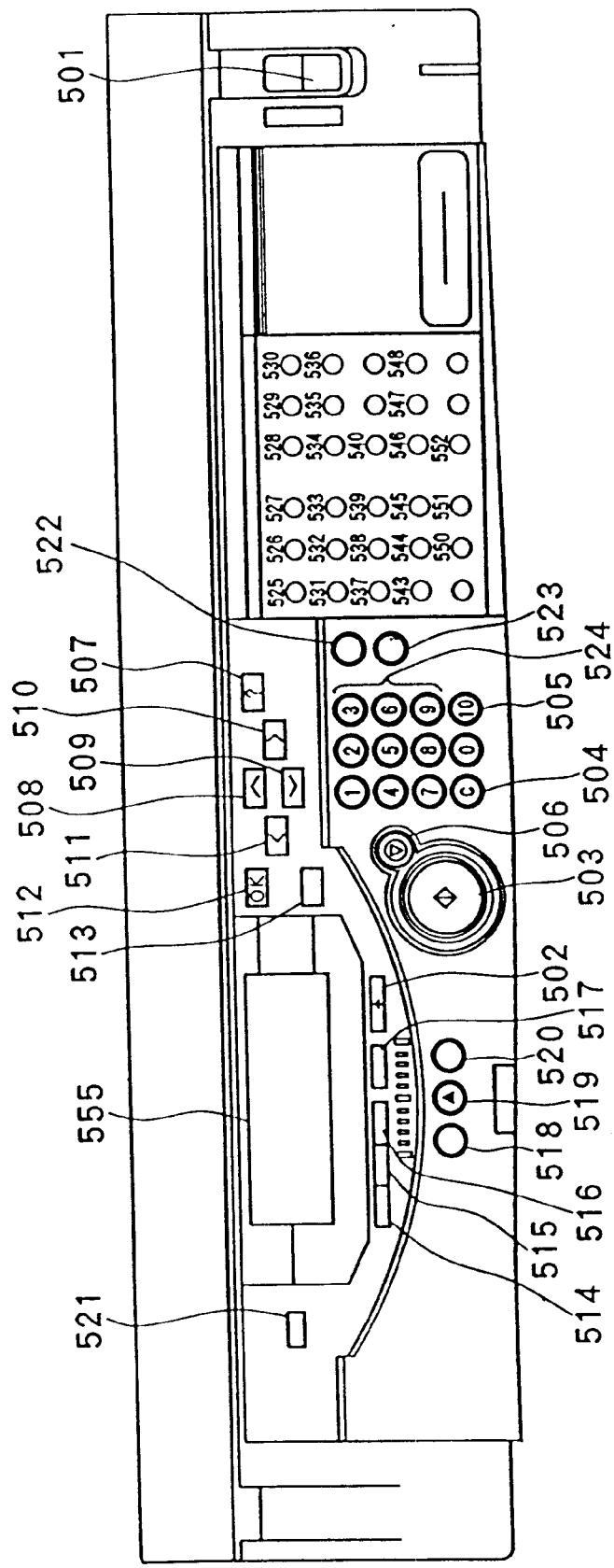
FIG. 3 is a top plan view of an operation panel of the copying apparatus according to the first embodiment.

FIG. 3 is a top plan view of the construction of the operation panel 500 of the present embodiment.

In FIG. 3, numeral 501 denotes a power switch for controlling the turning on/off of the apparatus; 502 denotes a reset key for setting a current mode to a standard mode in a stand-by status; 503 denotes a copy start key; 504 denotes a clear key for clearing numerical values; 505 denotes an ID key for enabling a copying operation with respect to a specific user, but prohibiting copying with respect to the others; 506 denotes a stop key for halting or cancelling copying operation; 507 denotes a guide key for guidance of various functions; 508 denotes an upper cursor key for moving a cursor in various setting images upward; 509 denotes a lower cursor key for moving the cursor in the various setting images downward; 510 denotes a right cursor key for moving the cursor in the various setting images rightward; 511 denotes a left cursor key for moving the cursor in the various setting images leftward; 512 denotes an OK key for confirming the set contents in the various setting images; and 513 denotes an execute key for executing content outputted at a lower right portion of a display screen to be described later in the various setting images.

Numeral 514 denotes a standard-size reduction key for reducing the standard copying size to another; size 515 denotes a same-size copying key for selecting same-size copying; 516 denotes a standard-size magnification key for magnifying a standard copying size; 517 denotes a cassette selection key for selecting the paper cassette to be used in copying; 518 denotes a copying density adjustment key for lowering the copying density; 519 denotes an AE key for automatically adjusting the copying density with respect to the density of original; 520 denotes a copying density adjustment key for increasing the copying density; 521 denotes a sorter operation designation key; 522 denotes a preparatory heating key for ON/OFF of a preparatory heating mode; and 524 denotes ten keys for inputting numerical values.

Numeral 525 denotes a marker processing key for setting trimming, masking, partial processing (outline processing, hatching, shadow-adding, negative/positive processing (reversing the gradations)) etc.; 526 denotes a pattern processing key for representing colors by patterns or difference of densities; 527 denotes a color deletion key for deleting a specific color; 528 denotes an image quality key for setting an image quality; 529 denotes a negative/positive key for negative/positive processing; 530 denotes an, a image create key for outline processing, hatching, shadow-adding, italic processing, mirror processing and repeat processing; 531 denotes a trimming key for designating an image area and performing trimming on the area; 532 denotes a masking key for designating an image area and masking the area; 533 denotes a partial processing key for designating an image area and designating a partial processing (outline processing, hatching, shadow-adding, negative/positive processing); and 534 denotes a frame deletion key for deleting a frame of an original image in accordance with a set mode. Note that frame-deletion modes include a sheet-frame deletion mode (for forming a frame in accordance with a several sheet size), an original-frame deletion mode for forming a frame in accordance with a designated original size), a book-frame deletion mode (for forming blank spaces at the central portion and the peripheral portions of an original in accordance with a designated spread book size.

Numeral 535 denotes a binding-margin key for forming a binding margin at one end of a recording sheet; and 536 denotes a movement key for movement. Note that the movement includes parallel movement (upward/downward/rightward/leftward), centering, movement to a corner and a designated movement (point designation. Numeral 537 denotes a zoom key for 1%-base setting of a zooming ratio from 25% to 400%. Note that the zooming ratio can be separately set for main-scanning and subscanning. Numeral 538 denotes an auto-zoom key for automatically changing a zooming ratio in accordance with a recording sheet size. Note that the auto-zooming ratio can be separately set for main-scanning and subscanning. Numeral 539 denotes a magnification & successive copy key for copying where an original image is magnified into a plurality of copies. Numeral 540 denotes a reduction layout key for copying where a plurality of original images are reduced into one page.

Numeral 543 denotes a successive copy key for dividing a copying range of the glass platen into right and left portions and automatically performing copying by two pages (successive page copying, double-sided copying); 544 denotes a double-sided copy key for double-sided copying (one-sided original to double-sided copy, successive pages to double-sided copy, double-sided original to double-sided copy); 545 denotes an overlaying key for overlaying (overlaying, overlaying of successive pages); 546 denotes a memory key for a mode using a memory (memory synthesizing, area synthesizing, openwork synthesizing); 547 denotes a projector key used when a projector is used; 548 denotes a printer key for making settings of a printer; 550 denotes a different-size key used when the sizes of pages of an original are different upon copying the original; 551 denotes a mode memory key for reading a registered copying mode to register a set copying mode; 552 denotes a mode switching key for switching of the copying mode and the image processing setting mode; and 555 denotes a display image for displaying the apparatus status, the number of copies, a copying ratio and a size of recording sheet, and in setting of a copying mode, and displaying setting contents.

<Copying Operation>

Figure 4:
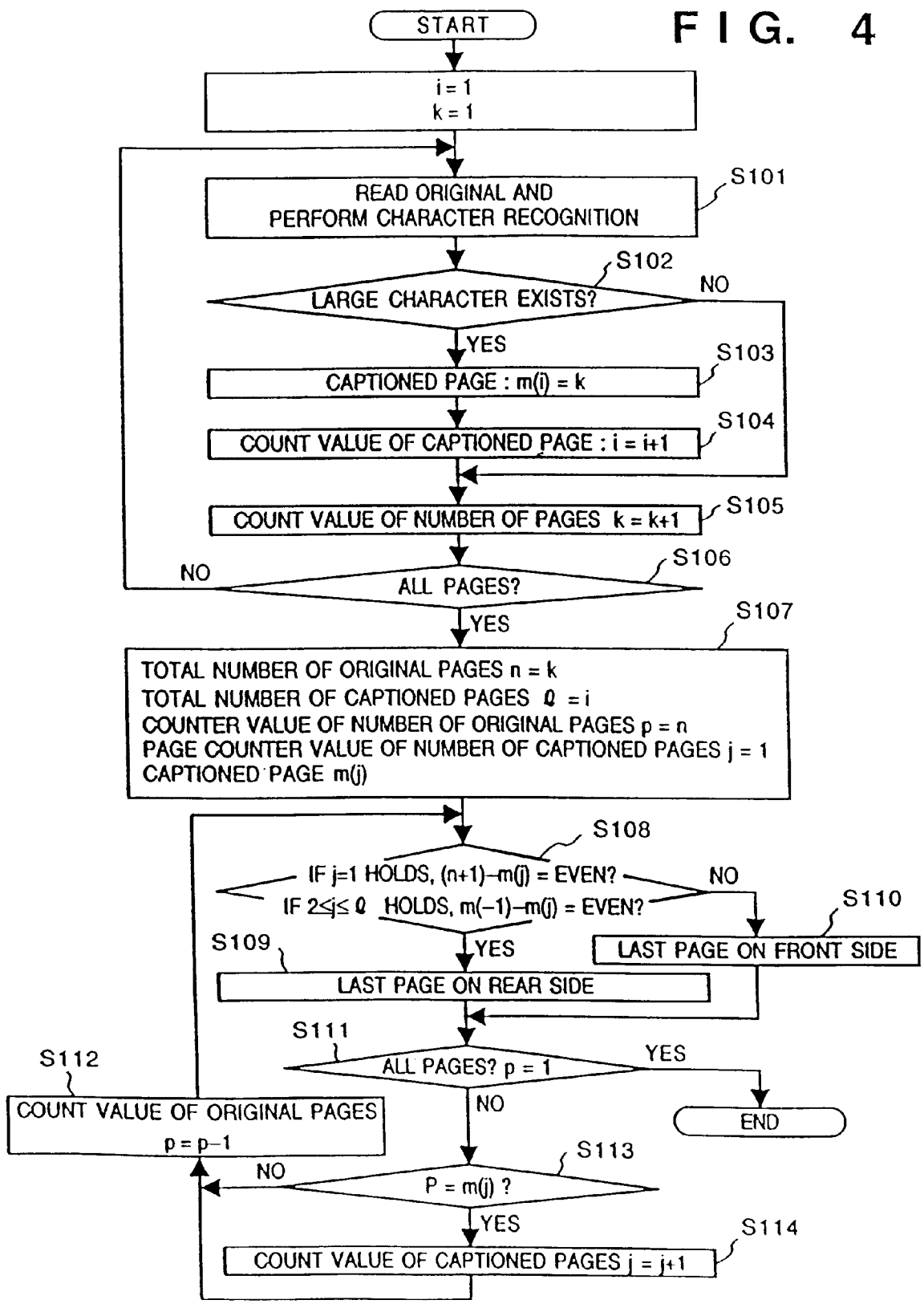
FIG. 4 is a flowchart showing a copying operation according to the first embodiment.

Next, a copying operation according to the present embodiment, to output an image of a page including a caption on the front side of a recording sheet, will be described with reference to the flowchart of FIG. 4.

It should be noted that the description will be made on the assumption that a count value i indicative of a page number of a page including a caption is "1", and an initial count value k of the number of pages of original is "1".

First, at the operation panel, as the copying mode is set to "single-sided→double-sided: caption mode", or "double-sided→double-sided: caption mode" and the start key is pressed, the document feeder 1 feeds an original (total number of pages: n), from the last page (n-th page), to the glass platen 2. The image reader 200 reads information of the original, then outputs the information to the recognition unit 600, and character recognition is performed on the input information (S101). As the recognized results are outputted to the CPU 401, the CPU 401 examines character sizes of the input recognized results (S102), and if it finds a large-sized character, it regards the character as a caption letter, and stores the page including the character (m(i)=k) into the RAM 403 (S103).

Then, the page number of the captioned page (a page including caption(s)) is counted (i=i+1 (S104)) and the number of pages of the original is counted (k=k+1 (S105)). If the character sizes are equal to each other, only the number of pages of the original is counted. In this manner, character recognition with respect to all the document pages has been completed (S106), and copying operation is performed.

Assuming the total number of original pages is n (n=k), the total number of captioned pages is i, the current count value of the number of original pages is p (initial value p=n), the count value of the captioned pages is j (initial value j=1), and the captioned page is m(j) (S107), when j=1holds, if the number of pages (n+1−m(1) from the last page (n) to the first captioned page (m(1)) is an even number (S108), copying is controlled such that the last page image is outputted onto the back side of a recording sheet (S109), and on the other hand, if it is an odd number, copying is controlled such that the last page image is outputted onto the front side of the recording sheet When copying has been completed to the first captioned page (S113), the number of the captioned page is counted (j=j+1 (S114)), and the number of the original pages is counted (p=p+1 (S112)). Thereafter, if the number of pages (m(j−1)-m(j)) from the (j−1)th captioned page (p=m(j)−1) to the next page of j-th captioned page (p=m(j)−1) is an even number (S108), the (m(j)−1)th page image is transferred onto the back side of a recording sheet and the (m(j)−2)th page image is transferred onto the front side of the recording sheet (S109), while if it is an odd number, the (m(j)−1)th page image is transferred onto the front side of a recording sheet, and then the recording sheet is discharged with it back side blank, and the (m(j)−2)th page image is transferred onto the back side of another recording sheet (S110).

The above operation is repeated until all the original pages have been copied (S111), when the CPU 401 ends the copying operation.

Figure 5:
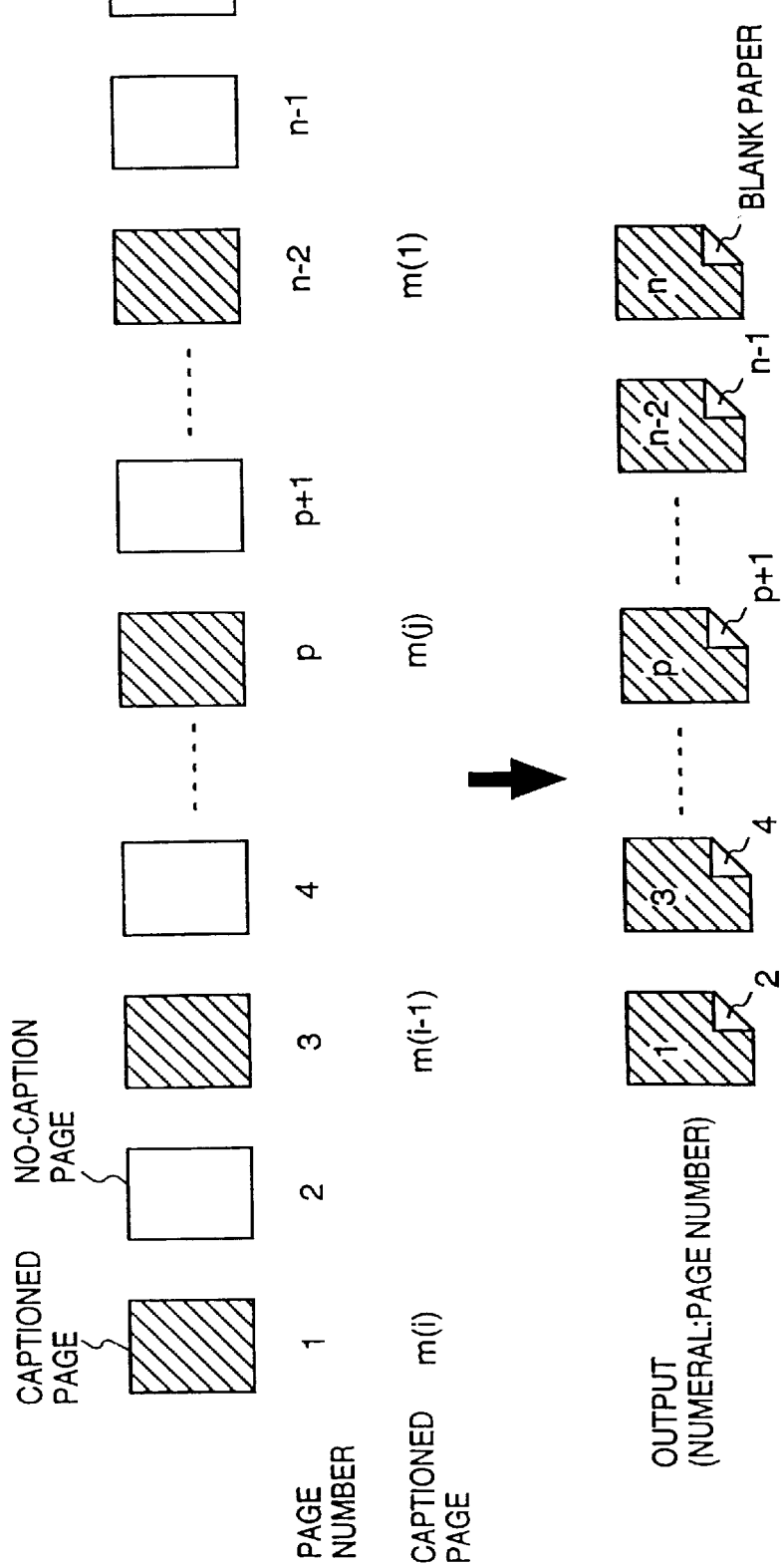
FIG. 5 is an explanatory view showing the relation between an original document and an output recording sheet.

FIG. 5 is an explanatory view showing recording sheets outputted by the above copying operation. As shown in FIG. 5, captioned pages (1, 3, p, n−1) are transferred onto the front side of the recording sheets.

Figure 6:
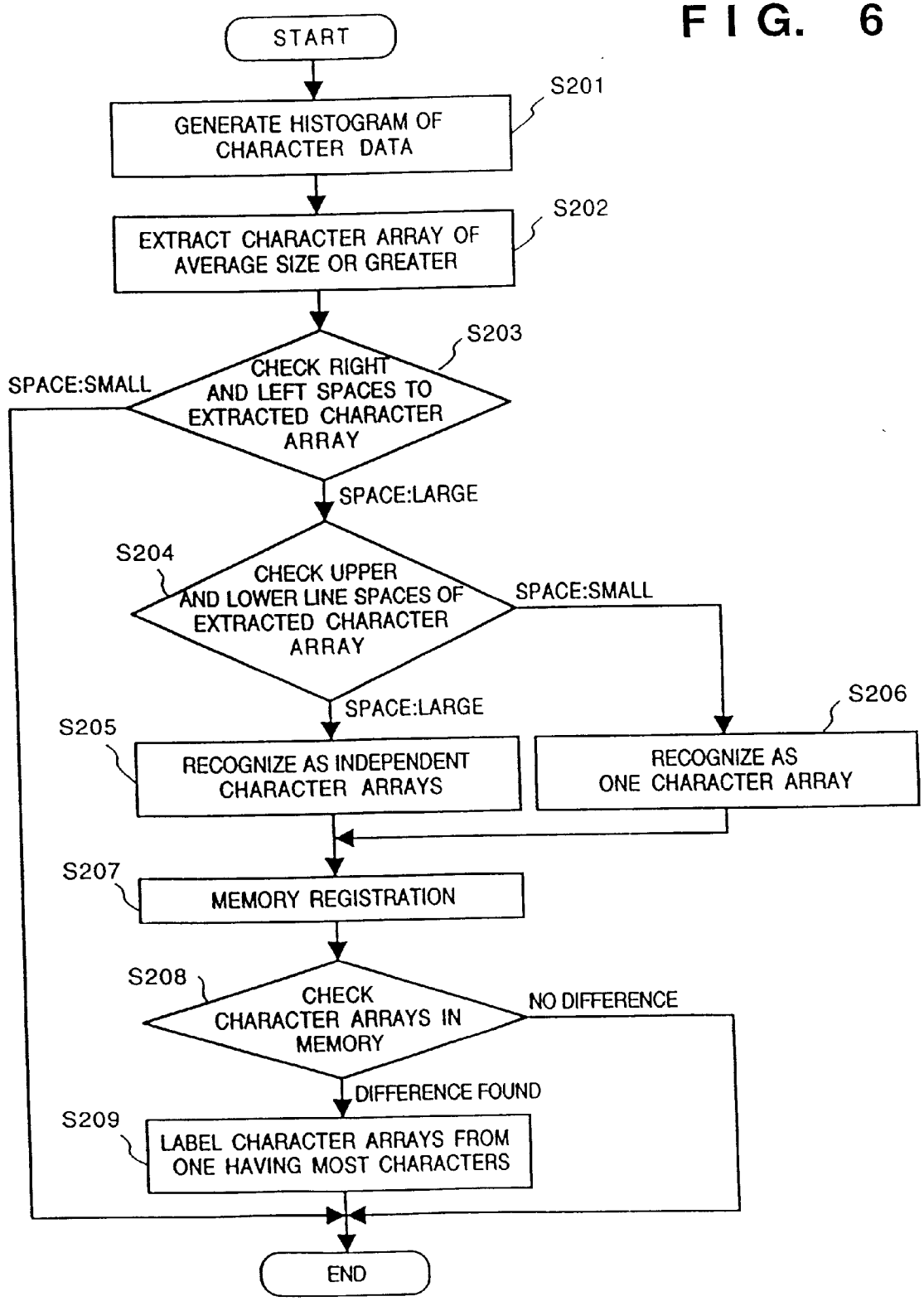
FIG. 6 is a flowchart showing caption-extraction processing according to the first embodiment.
Figure 7:
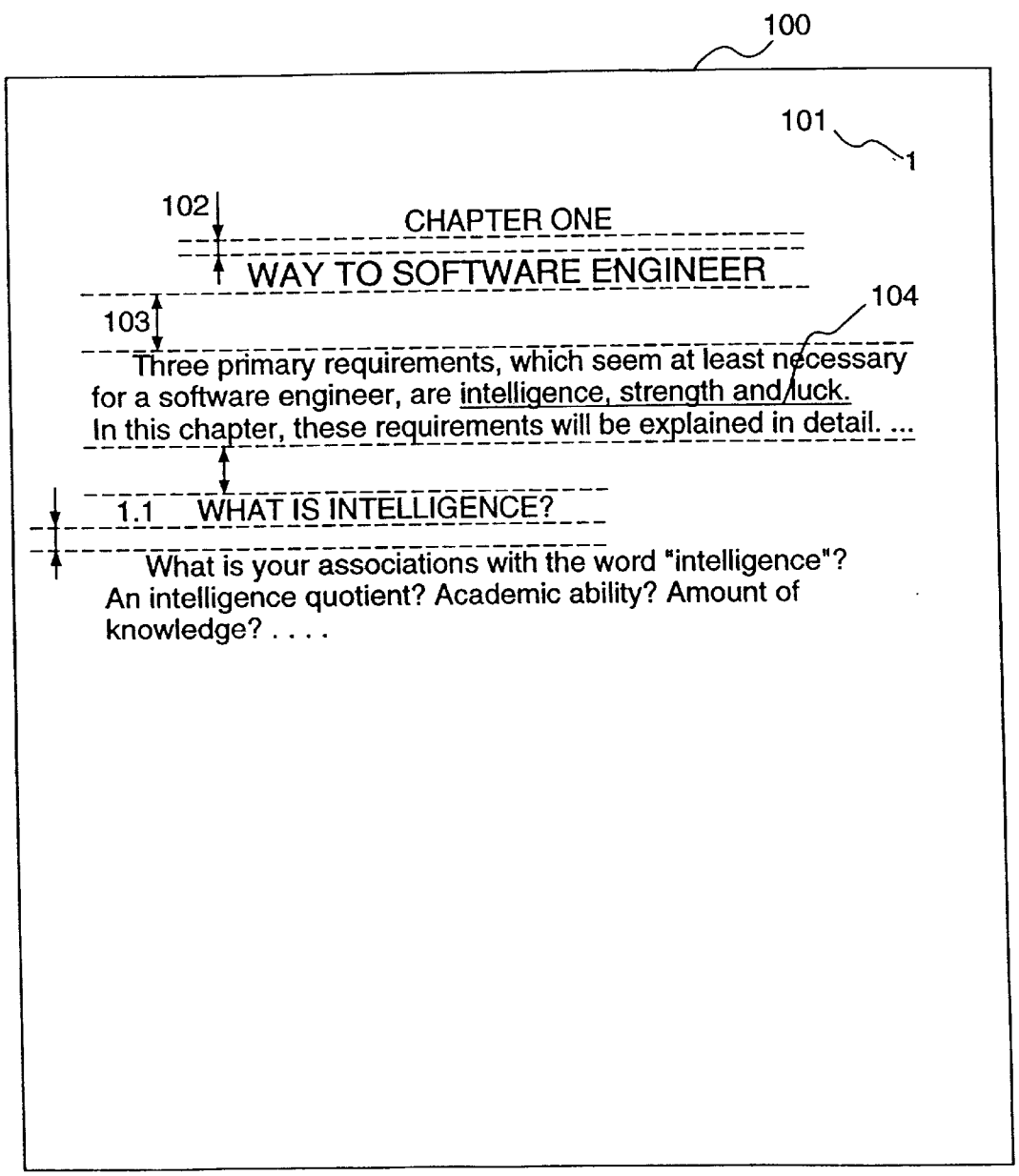
FIG. 7 is an example of an original document page.

Next, the above caption extraction method will be described in detail with reference to the flowchart of FIG. 6 and the sample original 100 shown in FIG. 7.

Upon caption extraction at the recognition unit 600, first, character recognition is performed on the whole original page, and a histogram of character data is generated (S201). Then, character arrays having a size larger than an average character size are cut out (S202). Next, the extracted character arrays are checked (S203) to determine whether or not right and left spaces to the character arrays are larger than a predetermined standard value as space between character arrays from the histogram. If the right and left spaces to the character arrays are larger than the predetermined standard value, the line spaces of the extracted character arrays are checked (S204). Otherwise, if the right and left spaces to the character arrays are less than the predetermined standard value, it is determined that there is no caption in the page, and the process ends.

Next, in the line space check (S204), if the upper and lower line spaces are larger than a predetermined standard value as the line space between character arrays from the histogram, it is determined that the extracted character arrays are independent character arrays, and the character arrays are separately recognized (S205). In FIG. 7, numeral 102 and 103 denote character arrays having line spaces larger than the predetermined standard value, and 104 denotes a character array having line spaces less than the predetermined standard value. If the line spaces of the extracted character arrays are less than the predetermined standard value, the character arrays are recognized as one character array (S206). Next, the recognition results are stored into the RAM 403 (S207), and registered character arrays are checked (S208) to determine whether there is a difference or there are differences in the histogram (size difference(s) among the registered character arrays). If there is a difference or there are differences in the histogram, the character arrays are labeled from an array having the most characters (S209), while if there is no difference in the histogram, the process ends.

As described above, according to the present embodiment, it is possible to automatically form a double-sided copy where a page including caption(s) is outputted on the front side of a recording sheet, without the user's manual operation.

According to the embodiment, utility can be improved by controlling image output regarding an original page including a specific character array or arrays.

[Second Embodiment]

Next, a second embodiment of the present invention will be described below [with reference to the drawings]. The second embodiment is a construction for extracting caption (s) and a page number of the captioned page, and automatically editing a table of contents.

First, an OCR principle of the present embodiment will be described with reference to FIG. 8.

Figure 8:
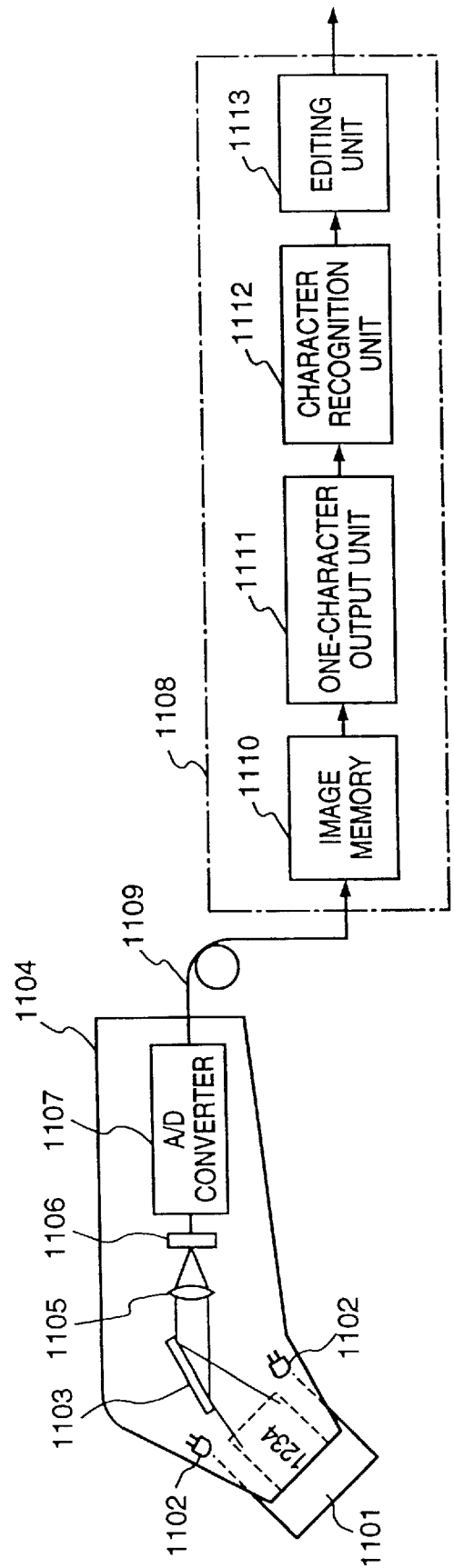
FIG. 8 is a block diagram for explaining the principle of OCR operation.

In FIG. 8, an original 1101 is scanned by an exposure system 1102 of an image reader 1104. The reflection light from the original is focused on a CCD 1106 via a mirror 1103 and a lens 1105, binarized by an A/D converter 1107, and inputted into an image processor 1108. Next, at the image processor 1108, the binary data is stored into an image memory 1110, then images, one character at a time (character patterns), are separated by a one-character cutout unit 1111, from the binary data in the image memory 1110, and character-recognized by a character recognition unit 1112. Note that the image processor 1108 has a dictionary, for character recognition. The one-by-one converted characters are edited by an editing unit 1113.

Figure 9:
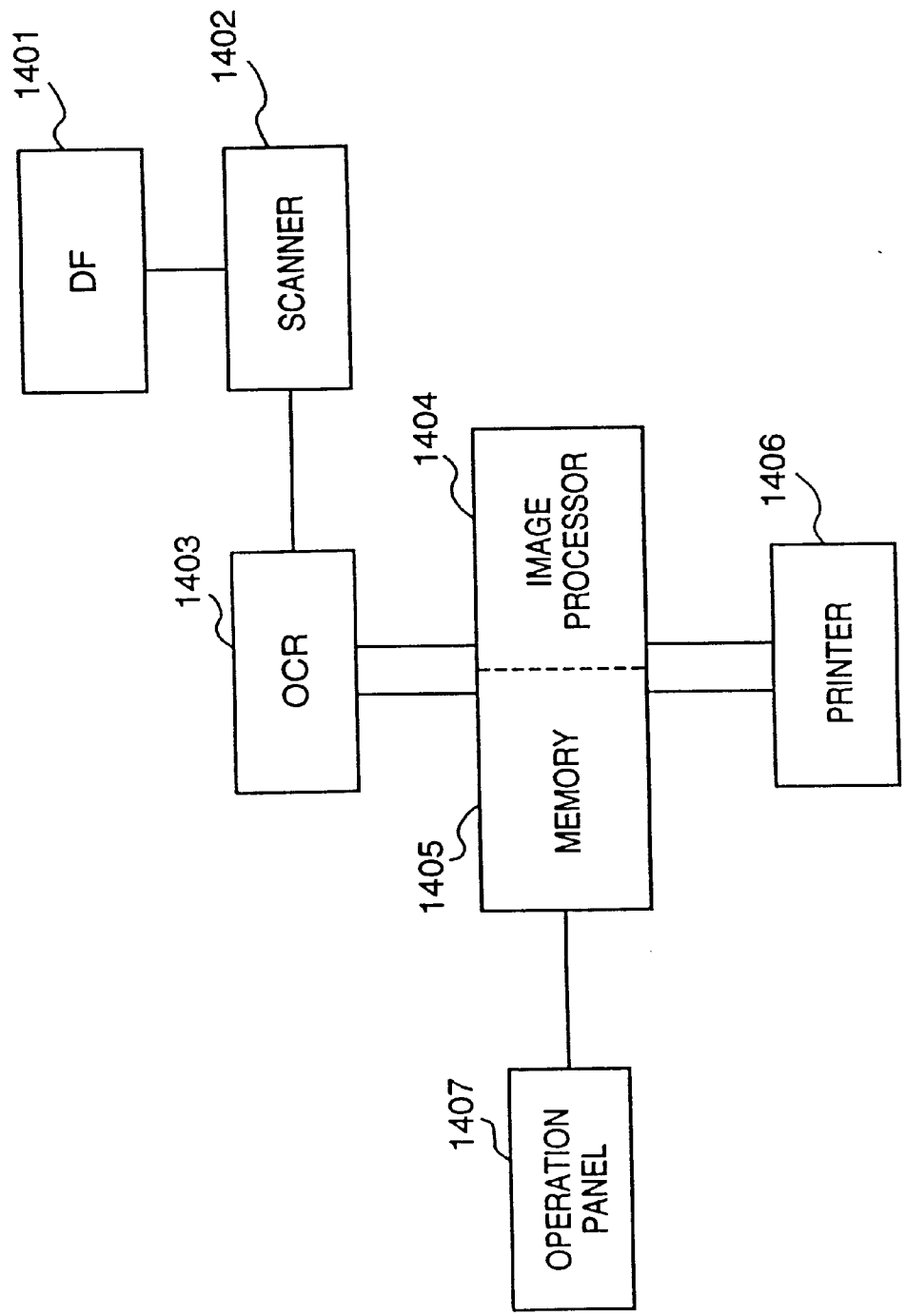
FIG. 9 is a block diagram showing the construction of a second embodiment comprising an OCR and an image copying apparatus.

FIG. 9 is a block diagram showing the construction of the second embodiment comprising the OCR and an image copying apparatus. Next, automatic editing of table of a contents will be described with reference to FIG. 9.

First, a DF 1401 feeds a page-numbered original document, of which a user wants to form a table of contents, to a DF 1401, and the scanner 1402 reads the original. Then, an OCR 1403 performs character recognition on image data read by the scanner 1402 from the original, and extracts a caption or captions and a page number from the recognized characters. If a caption or caption is or captions are found in the image, the caption and the page number are stored, as a pair, into a memory 1405. Next, an image processor 1404 arranges the captions stored in the memory 1405 in numerical order based on the page numbers, and a printer 1406 outputs the arranged captions as a table of contents. Note that upon arranging the captions, if correction of the table of contents to be outputted is required, the table of contents is corrected by input from an attached operation panel 407.

Figure 10:
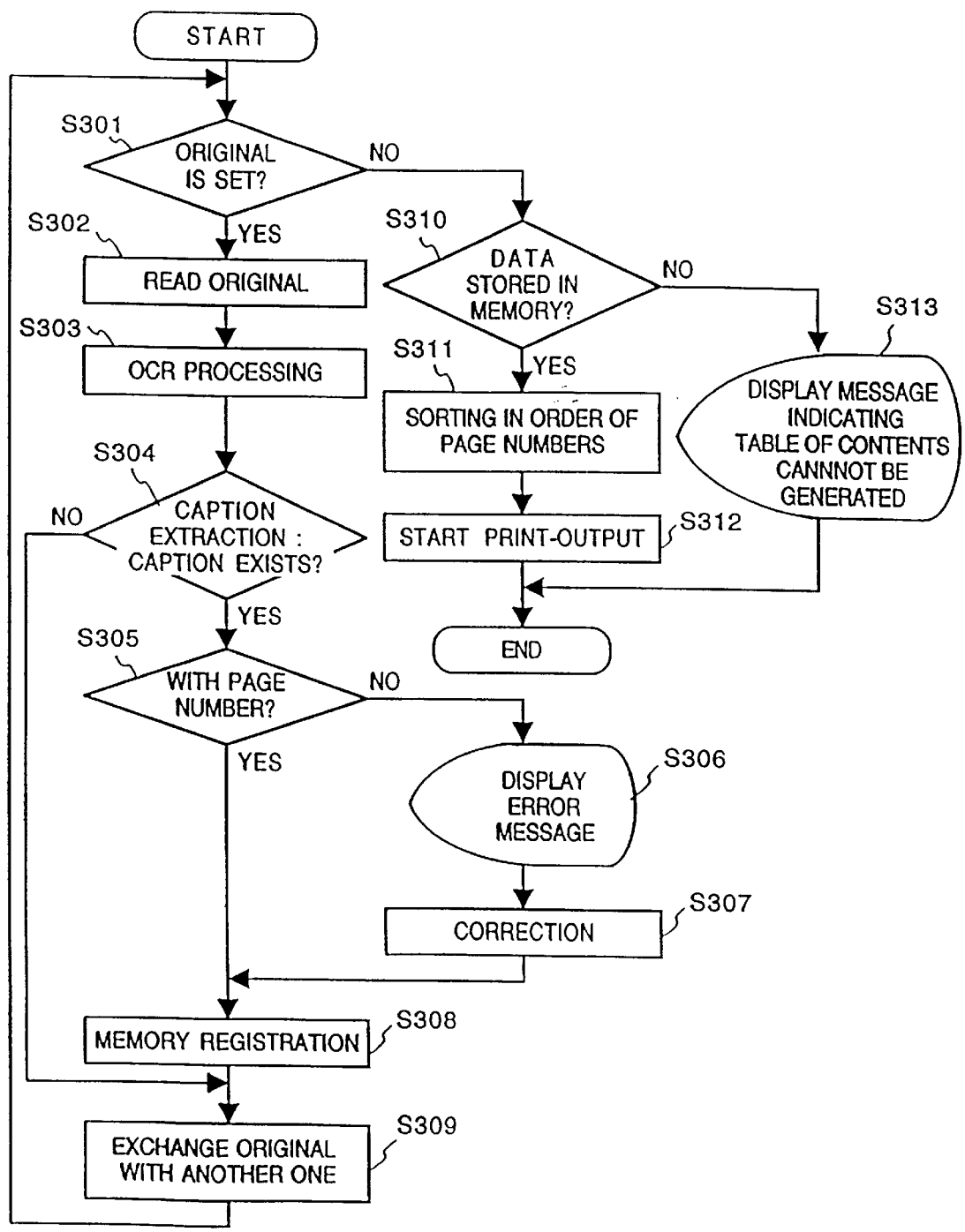
FIG. 10 is a flowchart showing processing by an image processor according to the second embodiment.

Next, processing by the above-mentioned image processor 1404 will be described with reference to the flowchart of FIG. 10.

First, at step S301, whether or not an original is set is checked. If YES, the process proceeds to step S302, at which the scanner 1402 reads the original, and at step S303, the OCR 1403 performs character recognition on the read image data. Next, at step S304, whether or not there is a caption among the character data is checked. If a caption is found, it is extracted. At the following step S305, whether or not there is a page number is checked. If a page number is found, the process proceeds to step S308, at which the extracted caption and the page number are stored, as a pair, into the memory 1405 (registration processing). Note that the above caption extraction is similar to that of the first embodiment, therefore the explanation of the caption extraction will be omitted. However, extraction of a page number will be described in detail later with reference to FIG. 12.

At step S305, if there is no page number, the process proceeds to step S306, at which an error message is displayed on a display portion of the operation panel 1407. Next, at step S307, a proper page number is inputted from the operation panel 1407. As the correction (input) has been completed, the process proceeds to step S308 to perform the above registration processing.

On the other hand, at step S304, if there is no caption among the character data, when the registration processing at step S308 has been completed, the process proceeds to step S309 at which the next page is read with another page. The exchange is made using the DF 1401 [in FIG. 8] or the like. Then, returning to step S301 at which existence/absence of the original is determined, the next image data is inputted.

In the above processing, when reading of all the original pages has been completed, the process proceeds to step S310, at which whether or not data on captions and page numbers are stored in the memory 1405 is checked. If data on captions and page numbers are found, the process proceeds to step S311, at which a table of contents is formed by sorting the page numbers registered in the memory 1405 in ascending order. Next, at step S312, the data on the formed table of contents is transferred to the printer 1406, and thus, output of the table of contents is started, and then the process ends. At step S310, if there is no data on captions and page numbers in the memory 1405, the process proceeds to step S313, at which a message indicative of the status where a table of contents cannot be formed is displayed at the display portion of the operation panel 1407, and then the process ends.

Figure 11:
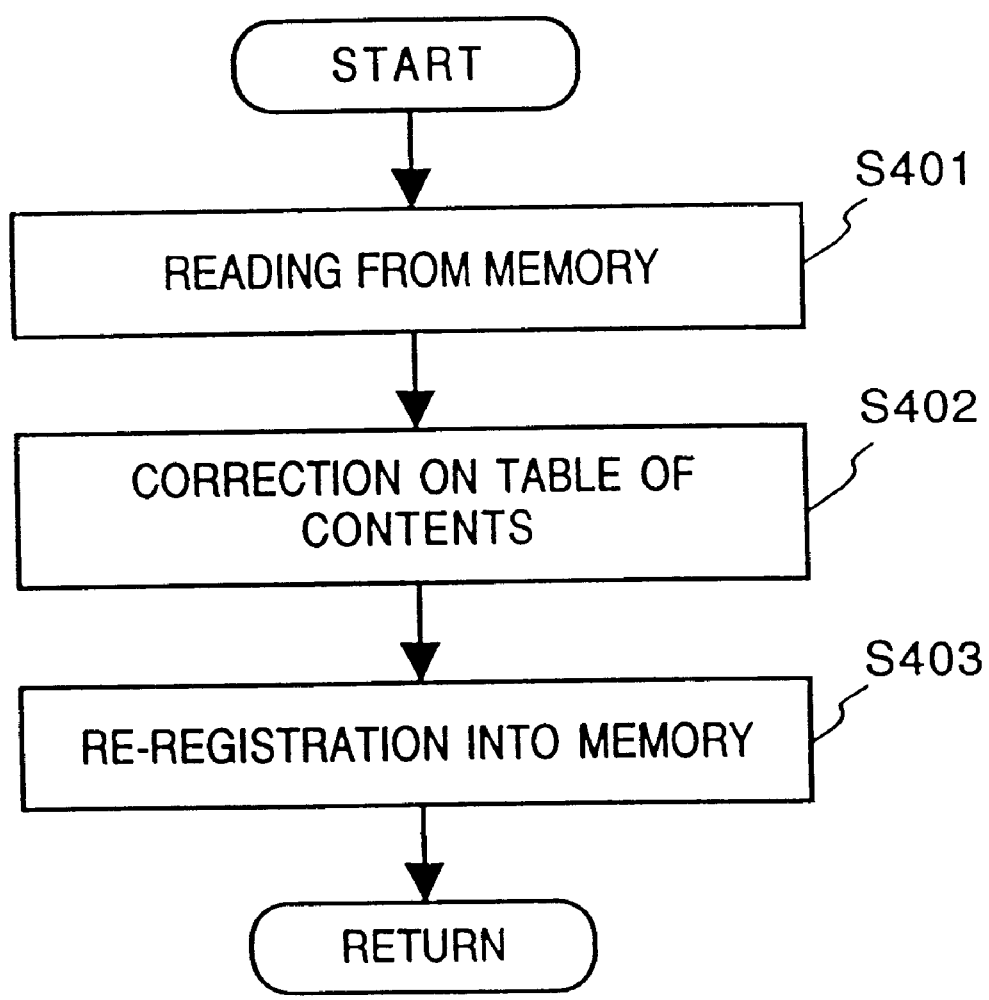
FIG. 11 is a flowchart showing correction processing according to the second embodiment.

Next, the above-mentioned page-number correction (input) processing will be described with reference to the flowchart of FIG. 11.

First, at step S401, data to be corrected is read out of the memory 1405, and at step S402, correction on caption(s) or page number(s) is made by input from the operation panel 1407. Thereafter, as correction of a table of contents has been completed, the corrected data is re-registered into the memory 1405 at step S403, and then the process ends.

Figure 12:
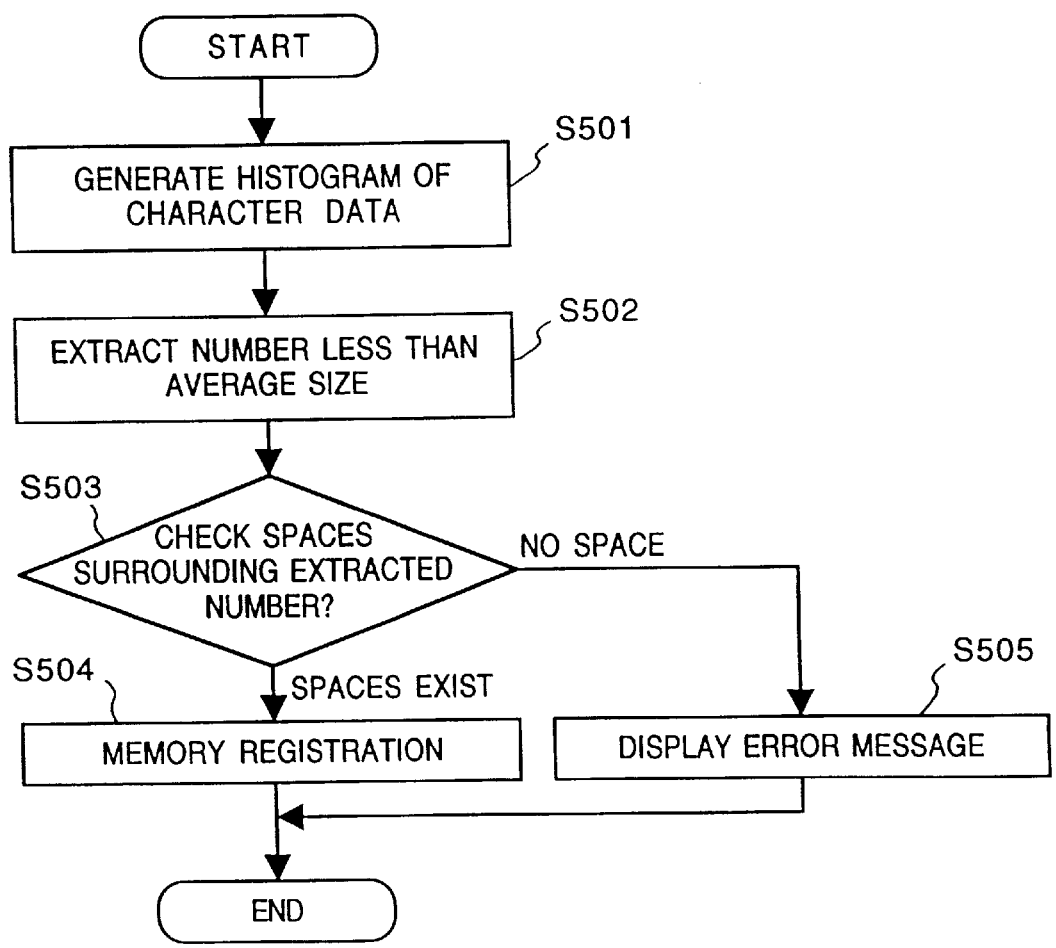
FIG. 12 is a flowchart showing page-number extraction processing according to the second embodiment.

Next, the above-mentioned page number extraction processing will be described with reference to the flowchart of FIG. 12.

First, similar to the caption extraction processing, a histogram of character data character-recognized by the OCR 1403 is generated at step S501. At step S502, a page number less than an average character size in the histogram (101 in FIG. 7) is picked up. Next, at step S503, upper and lower line spaces and right and left spaces to the number are checked. If the spaces surrounding the picked up number, i.e., space between characters in the histogram is equal to or larger than a predetermined standard value, the process proceeds to step S504, at which the data is registered as a page number. If the spaces surrounding the number are less than the predetermined standard value, the process proceeds to step S505, at which an error message is displayed at the display portion on the operation panel 1407.

Further, as shown in FIG. 13, if there are two or more captions (captions 1601 and 1602 in FIG. 13) in the same page, the page number (1603 in FIG. 13) extracted by the page number extraction is outputted to the associated caption (1602 in FIG. 13).

In this manner, according to the second embodiment, it is possible to extract captions and page numbers and automatically generate a table of contents.

[Third Embodiment]

Next, a third embodiment of the present invention will be described below with reference to the drawings.

The third embodiment will be described as a case where a table of contents is generated with respect to an original having unnumbered pages. In this case, first, copying of the original is made, and page numbers are recorded at a predetermined position of image data by add-on (overlaying copying) which is one of the functions of copying machines. If the copying apparatus has a page memory, image data both sides page-number data are synthesized on the memory, at one scanning, and a copy page is outputted in accordance with the synthesized image data. Note that the construction of the copying apparatus is similar to that of the second embodiment, and therefore the explanation of the construction will be omitted.

Figure 14:
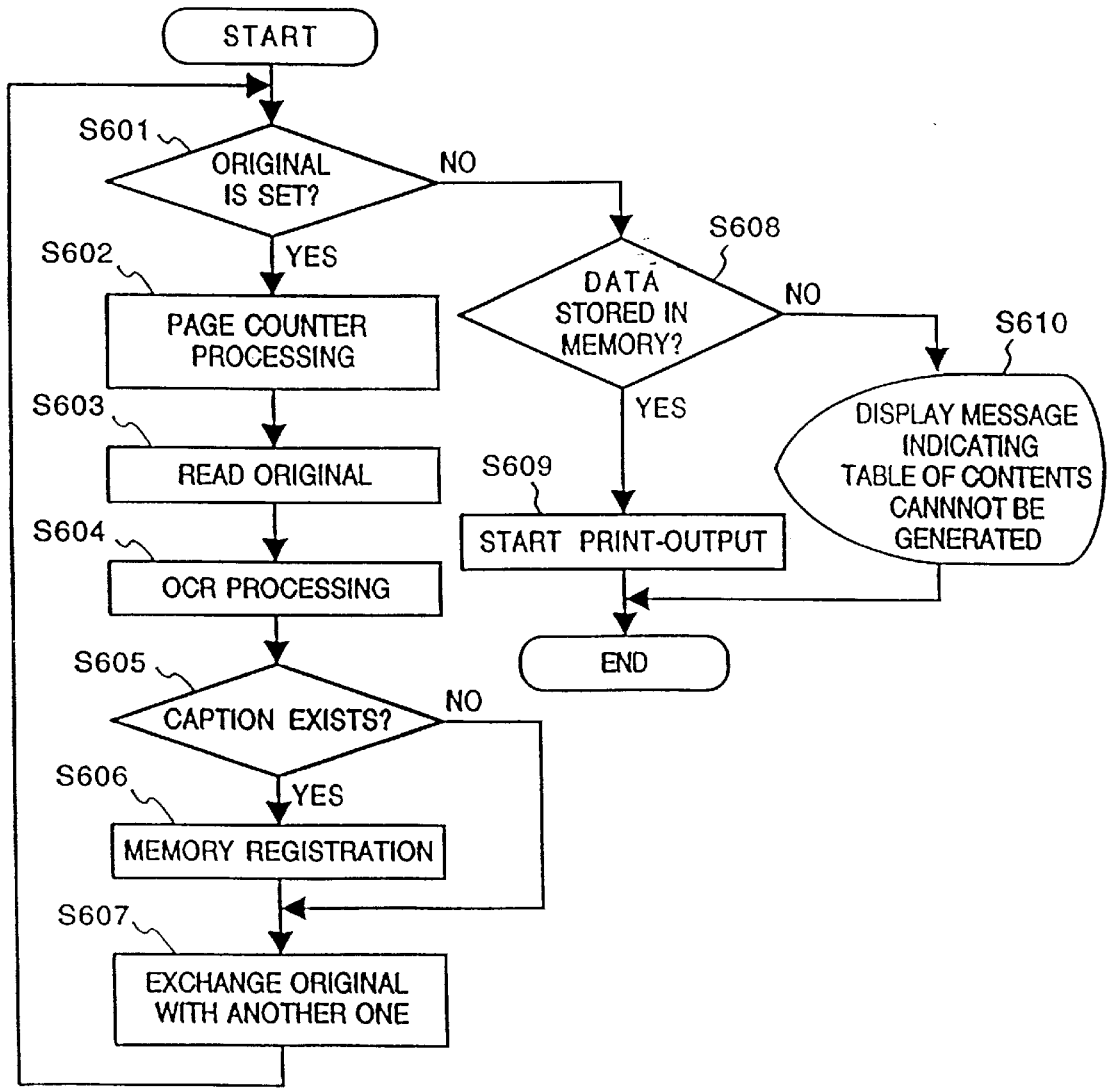
FIG. 14 is a flowchart showing processing by an image processor according to a third embodiment.

FIG. 14 is a flowchart showing processing by the image processor 1404 according to the third embodiment.

At step S601, whether or not an original is set is checked. If YES, the process proceeds to step S602, at which a value of a page counter is incremented by one (+1), so as to maintain the correspondence between page numbers and actual pages. Next, at step S603, the scanner 1402 inputs image data from the original, and at step S604, the OCR 1403 performs character recognition. At step S605, whether or not there is a caption among character data is checked. If a caption is found, the caption and a page number based on the page counter value are registered, as a pair, into the memory 1405 at step S606. At step S605, if there is no caption among the character data, after the page number is registered at step S606, the process proceeds to step S607 at which the original page is exchanged for another original page. The process returns to step S601 to check the existence/absence of original and input the next original.

By the above processing, as reading of all the original pages has been completed, the process proceeds to step S608 to check whether or not data on captions and page numbers are stored in the memory 1405. If YES, the process proceeds to step S609, at which the data on the captions and page numbers are transferred to the printer 1406, to start output of a table of contents. At step S608, if there is no data on the captions and page numbers, the process proceeds to step S610, at which a message indicating that a table of contents cannot be generated at the display portion of the operation panel 1407, and the process ends.

According to the second and third embodiments, even if an original has pages with disordered page numbers or unnumbered pages, a table of contents can be easily generated by merely inputting an original.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

As described above, according to the second and third embodiments, an image forming apparatus that automatically edits a table of contents of the input original, thus improving utility for users, and an editing method for the apparatus can be provided.

The present invention is not limited to the above embodiments and various changes and modifications can be made within the spirit and scope of the present invention. Therefore, to apprise the public of the scope of the present invention, the following claims are made.

What is claimed is:

1. A computer-readable memory medium for storing program codes executed by a computer, the program codes comprising:

a first code for a step of detecting an image including a caption image from a plurality of images;

a second code for a step of preventing an image including a caption image from being recorded on a back side of a recording sheet by determining whether the image including the caption image will be recorded on a back side of a recording sheet; and a third code for a step of controlling a printer so that a back side is left blank and the image including the caption is recorded on a front side of a recording sheet, when such a determination is made.

2. The memory medium according to claim 1, wherein said first code detects an image including large-sized characters as the image including the caption image.

3. The memory medium according to claim 1, wherein said first code detects the caption image based on a space between characters in the image.

4. A computer-readable memory medium for storing program codes executed by a computer, the program codes comprising:

a first code for a step of recognizing characters representing a caption image;

a second code for a step of detecting a page number of an image including the caption image; and a third code for a step of generating an image of a table of contents, based on the result of the recognition and the detection.

5. The memory medium according to claim 4, wherein said second code detects the page numbers by counting a page number of the image.

6. The memory medium according to claim 4, wherein said second code detects page numbers in the image.

7. The memory medium according to claim 4, wherein the program codes further comprise a fourth code for a step of correcting the table of contents based on an operation by an operator.

8. The memory medium according to claim 4, wherein the program codes further comprise a fourth code for a step of outputting the table of contents to a printer.

* * * * *

UNITED STATES PATENT AND TRADEMARK OFFICE
CERTIFICATE OF CORRECTION

PATENT NO. : 6,014,459  
DATED : January 11, 2000  
INVENTOR(S) : Masayoshi Taira et al.

Page 1 of 1

It is certified that error appears in the above-identified patent and that said Letters Patent is hereby corrected as shown below:

Title page,
Item [75], Inventors "Yokohamai;" should read -- Yokohama; --.

Column 1,
Line 12, "a" (second occurrence) should be deleted.

Column 4,
Line 23, "sheets. Serially" should read -- sheets serially --.
Line 35, "denote," should read -- denote -.

Column 5,
Line 10, "another; size" should read -- another size; --.
Line 32, "an, a" should read -- an --.
Line 47, "size)," should read -- size, --.
Line 49, "size." should read -- size) . --.
Line 55, "designation." should read -- designation). --.

Column 6,
Line 9, "(overlaying, overlaying" should read -- (overlaying --.
Line 64, "sheet" should read -- sheet (S110). --.

Column 7,
Line 8, "it" should read -- its --.

Column 8,
Line 21, "table of a" should read -- a table of --.
Line 29, "or caption" should be deleted.

Signed and Sealed this

Fifth Day of March, 2002

*Attest:*

JAMES E. ROGAN  
*Attesting Officer*     *Director of the United States Patent and Trademark Office*